United States Patent
Zhang et al.

(10) Patent No.: US 10,721,108 B2
(45) Date of Patent: Jul. 21, 2020

(54) SYSTEM INFORMATION BLOCK ENHANCEMENT FOR LOW COMPLEXITY USER EQUIPMENT AND/OR USER EQUIPMENT IN COVERAGE ENHANCEMENT MODE

(71) Applicant: Nokia Solutions and Networks Oy, Espoo (FI)

(72) Inventors: Yan Ji Zhang, Beijing (CN); Rapeepat Ratasuk, Hoffman Estates, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/543,695

(22) PCT Filed: Jan. 29, 2016

(86) PCT No.: PCT/EP2016/051965
§ 371 (c)(1),
(2) Date: Jul. 14, 2017

(87) PCT Pub. No.: WO2016/120462
PCT Pub. Date: Aug. 4, 2016

(65) Prior Publication Data
US 2017/0373902 A1    Dec. 28, 2017

Related U.S. Application Data

(60) Provisional application No. 62/109,957, filed on Jan. 30, 2015.

(51) Int. Cl.
*H04L 27/26* (2006.01)
*H04W 48/12* (2009.01)
(Continued)

(52) U.S. Cl.
CPC ........ *H04L 27/2617* (2013.01); *H04L 5/0007* (2013.01); *H04L 5/0053* (2013.01);
(Continued)

(58) Field of Classification Search
CPC . H04L 27/2617; H04L 5/0007; H04L 5/0053; H04L 5/0092; H04W 48/12; H04W 72/12; H04W 4/70
See application file for complete search history.

(56) References Cited

U.S. PATENT DOCUMENTS

2007/0260851 A1* 11/2007 Taha ................. H04W 52/0229
                                                              712/204
2008/0170526 A1* 7/2008 Narang ............. H04W 52/0216
                                                              370/311
(Continued)

FOREIGN PATENT DOCUMENTS

WO    2013/131262 A1    9/2013
WO    2013/183966 A1    12/2013
(Continued)

OTHER PUBLICATIONS

Uemura et al., Terminal Units, Base Station Apparatus, Communication Systems, Communication Methods, and Integrated Circuits, U.S. Appl. No. 62/104,638, filed Jan. 16, 2015.*
(Continued)

*Primary Examiner* — Justin T Van Roie
(74) *Attorney, Agent, or Firm* — Squire Patton Boggs (US) LLP

(57) ABSTRACT

Various communication systems may benefit from efficient communication of system information. For example, certain wireless communication systems may benefit from system information block enhancement for low complexity user equipment and/or user equipment in coverage enhancement mode. A method can include decoding a transport block size
(Continued)

(TBS) index in a compact downlink control information. The method can also include monitoring for SIB based on the decoded TBS index. The method may optionally include monitoring for the SIB based on a predefined transmission pattern of physical downlink control channel for machine type communication. The method may also optionally include decoding of M-SI messages from a subframe according to a pattern indicated by an information element in M-SIB1.

15 Claims, 10 Drawing Sheets

(51) Int. Cl.
    *H04L 5/00*         (2006.01)
    *H04W 4/70*       (2018.01)
    *H04W 72/12*     (2009.01)

(52) U.S. Cl.
    CPC .............. *H04L 5/0092* (2013.01); *H04W 4/70* (2018.02); *H04W 48/12* (2013.01); *H04W 72/12* (2013.01)

(56) References Cited

U.S. PATENT DOCUMENTS

| | | | |
|---|---|---|---|
| 2010/0022250 A1* | 1/2010 | Petrovic | H04J 11/0093 455/450 |
| 2013/0114533 A1 | 5/2013 | Ji et al. | |
| 2013/0308572 A1 | 11/2013 | Sayana et al. | |
| 2014/0169324 A1* | 6/2014 | Seo | H04L 5/001 370/329 |
| 2014/0301268 A1* | 10/2014 | Xu | H04W 24/02 370/312 |
| 2015/0057046 A1* | 2/2015 | Challa | H04W 48/12 455/558 |
| 2015/0078334 A1* | 3/2015 | Peruru | H04W 76/10 370/331 |
| 2015/0099528 A1* | 4/2015 | Hu | H04W 72/042 455/452.1 |
| 2015/0296518 A1 | 10/2015 | Yi et al. | |
| 2015/0304080 A1* | 10/2015 | Yi | H04L 1/08 370/329 |
| 2015/0327155 A1* | 11/2015 | Lee | H04W 76/14 370/329 |
| 2016/0088595 A1* | 3/2016 | You | H04L 5/0094 370/329 |
| 2016/0212663 A1* | 7/2016 | Uemura | H04W 36/0083 |
| 2018/0270634 A1* | 9/2018 | Kim | H04W 48/00 |

FOREIGN PATENT DOCUMENTS

| | | | |
|---|---|---|---|
| WO | 2014069945 A1 | 5/2014 | |
| WO | 2014/111727 A1 | 7/2014 | |

OTHER PUBLICATIONS

"New WI proposal: Further LTE Physical Layer Enhancements for MTC", 3GPP TSG-RAN meeting #65, RP-141660, Agenda: 14.1.1, Ericsson, Sep. 9-12, 2014, 9 pages.
"LS on Observations on SIB Performance for Rel-13 Low-Complexity UE", 3GPP TSG-RAN Working Group 1 meeting #79, R1-145414, RAN1, Nov. 17-21, 2014, 2 pages.
"LS on Simultaneous Reception Requirements and SIBs for MTC UEs", 3GPP TSG-RAN Working Group 1 meeting #79, R1-145416, RAN WG1, Nov. 17-21, 2014, 2 pages.
"[Draft] LS on PBCH and RACH for LTE Rel-13 MTC", 3GPP TSG-RAN Working Group 1 meeting #79, R1-145476, Ericsson, Nov. 17-21, 2014, 2 pages.
"Considerations on Common Control Messages for MTC Enhancement", 3GPP TSG-RAN Working Group 1 meeting #79, R1-144820, Agenda : 6.3.1.2.2, ZTE, Nov. 17-21, 2014, 7 pages.
"Control-Less Transmission of Common Messages for Low Complexity Rel-13 UEs", 3GPP TSG-RAN Working Group 1 meeting #79, R1-144583, Agenda : 6.3.1.2.2, Huawei, Nov. 17-21, 2014, 3 pages.
"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.4.1, Dec. 2014, pp. 1-410.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 12)", 3GPP TS 36.300, V12.4.0, Dec. 2014, pp. 1-251.
"Common Control Message Transmission for MTC", 3GPP TSG-RAN Working Group 1 meeting #79, R1-144895, Agenda : 6.3.1.2.2, LG Electronics, Nov. 17-21, 2014, 6 pages.
International Search Report and Written Opinion received for corresponding Patent Cooperation Treaty Application No. PCT/EP2016/051965, dated Jun. 28, 2016, 20 pages.
"Design of Common Control Messages for MTC", 3GPP TSG-RAN Working Group 1 meeting #79, R1-144996, Agenda: 6.3.1.2, Nokia Networks, Nov. 17-21, 2014, 4 pages.
"SIB, RAR and Paging for Rel-13 MTC UE in Normal and Coverage Extension", 3GPP TSG-RAN Working Group 1 meeting #79, R1-144851, Agenda: 6.3.1.2.2, Media Tek Inc., Nov. 17-21, 2014, 5 pages.
Office Action dated Mar. 19, 2019 corresponding to Thailand Patent Application No. 1701004170, and English translation thereof.
Communication pursuant to Rule 164(2)(b) and Article 94(3) EPC issued in corresponding European Patent Application No. 16702910.7.
"MIB analysis for Low cost MTC", 3GPP TSG-RAN WG2 Meeting #89bis, R2-151067, Agenda 7.4.2, Nokia Networks, Apr. 10-24, 2015, 3 pages.
"SIB Scheduling for MTC", 3GPP TSG-RAN WG2 Meeting #89, R2-150131, Agenda 7.4.1, Nokia Networks et al., Feb. 9-13, 2015, 3 pages.
Communication pursuant to Article 94(3) EPC issued in corresponding European Patent Application No. 16 702 910.7, dated Apr. 2, 2020.

\* cited by examiner

SYSTEM INFORMATION BLOCK ENHANCEMENT FOR LOW COMPLEXITY USER EQUIPMENT AND/OR USER EQUIPMENT IN COVERAGE ENHANCEMENT MODE

CROSS-REFERENCE TO RELATED APPLICATIONS

This application was originally filed as PCT Application No. PCT/EP2016/051965 filed Jan. 29, 2016, which claims priority benefit from U.S. Patent Application No. 62/109,957, filed Jan. 30, 2015.

BACKGROUND

Field

Various communication systems may benefit from efficient communication of system information. For example, certain wireless communication systems may benefit from system information block enhancement for low complexity user equipment and/or user equipment in coverage enhancement mode.

Description of the Related Art

Third generation partnership project (3GPP) release 13 (Rel-13) includes a work item entitled "Further LTE Physical Layer Enhancements for MTC," see 3GPP RP-141660, which is incorporated herein by reference in its entirety. This work item aims to specify a new user equipment (UE) for machine type communication (MTC) or machine to machine (M2M) operation in long term evolution (LTE) that also allows for enhanced coverage compared to existing LTE networks and low power consumption. More particularly, one objective is to specify a new Rel-13 low complexity UE category/type for MTC operation in any LTE duplex mode, including full duplex frequency division duplex (FDD), half duplex FDD, and time division duplex (TDD), based on the release 12 (Rel-12) low complexity UE category/type supporting additional capabilities. The additional capabilities not present in Rel-12 may be reduced UE bandwidth of 1.4 MHz in downlink and uplink, reduced maximum transmit power, and reduced support for downlink transmission modes. The Rel-13 low complexity UE may be a new UE category/type or based on an existing UE category/type but with reduced capabilities. The Rel-13 low complexity UE may be indicated to the network using UE category field or UE capability field.

Further UE processing relaxations can also be considered. However those capabilities restriction may lead to downlink performance degradation. As a result, the number of bits that can be reliably transmitted on the SIB messages may be reduced. For example, for Rel-13 low complexity UE in normal coverage, for example when signal to noise ratio (SNR)=−4 dB, repetition may be required to transmit SIB messages and the number of repetitions can be high, for example 16-32 repetitions may be required for system information block (SIB) size of 328 bits.

Additionally, the number of repetitions may increase with the SIB size. For example, 16-32 repetitions may be required for SIB size of 328 bits, while 30-40 repetitions may be required SIB size of 504 bits. Furthermore, for a given SIB size, it may be more efficient to use one SIB rather than multiple smaller SIBs.

As per existing specification, the SIBs transmissions are scheduled via physical downlink control channel (PDCCH) which may consume extra downlink (DL) capacity and prolong the system information (SI) acquisition latency especially if the PDCCH transmission is repeated due to coverage limitation.

For acquiring other SIBs, with existing SI-window based scheme, the eNB can schedule as many SI message transmissions as needed. Consequently, the UE may then need to monitor the PDCCH masked with SI-RNTI on each subframe to acquire detailed scheduling of SI message on the same subframe within the SI-window.

The existing system information operation is not applicable for Rel-13 low complexity UEs, for example due to the constraint on their capabilities.

There may be other options for system information enhancement, such as indication of narrow band location for SIB(s) within MIB, control-less transmission of system information, or control-less transmission of common messages for low complexity Rel-13 UEs, each having their own tradeoffs.

SUMMARY

According to a first embodiment, a method can include receiving SIB at a user equipment at a fixed frequency location.

In a variant, the SIB may be an M-SIB.

In a further variant, the M-SIB may be an M-SIB1.

According to a second embodiment, a method can include determining whether the access point supports a user equipment category or a user equipment capability by decoding MIB. The method can further include determining whether to continue accessing a cell based on whether the access point supports the user equipment category or user equipment capability.

In a variant, the user equipment category or user equipment capability can be Rel-13 low complexity.

According to a third embodiment, a method can include decoding a TBS index in a compact DCI or an information element field. The method can also include monitoring for SIB based on the decoded TBS index.

In a variant, the compact DCI can be sent in EPDCCH.

In a variant, the information element field can be sent in MIB.

In a variant, monitoring for SIB can include monitoring for M-SIB1.

In a variant, the compact DCI can be configured to contain the TBS index and/or frequency location of PDSCH transmission which could be applied for SIB.

In a variant, the compact DCI or information element field can be configured to contain the repetition factor or pattern, frequency hopping pattern or indicator, or indicator of additional reference signal.

According to a fourth embodiment, a method can include monitoring for a TBS of SIB based on a predefined transmission pattern of physical downlink control channel for machine type communication. The method can also include decoding the TBS index.

In a variant, the SIB can be M-SIB1.

According to a fifth embodiment, a method can include decoding of SI messages from a subframe according to a pattern indicated by an information element in SIB1.

In a variant, the information element may be schedulingInfoList.

In a variant, schedulingInfoList may omit an si-window.

According to a sixth embodiment, a method can include decoding a PDSCH transmission of SI messages based on a TBS indicated in SIB1.

In a variant, the TBS may be indicated by schedulingInfoList.

In a variant, TBS index for each of a plurality of S1 is indicated in SIB1.

In a variant, the frequency location for each of a plurality of S1 is indicated in SIB1.

The methods according to the first through sixth embodiments, in each of their respective variants, can be used alone or in combination with one another.

For example, in a seventh embodiment, a method can include receiving a first system information block comprising key information regarding a cell and a network. The method can also include acquiring additional information from the cell or network based on the first system information block.

In a variant, the first system information block can be an M-SIB1.

In a variant, the first system information block can include scheduling information regarding one or more other system information blocks.

In a variant, the method can further include acquiring additional system information not provided in the first system information block based on information in the first system information block.

In a variant, the first system information block can have a fixed frequency location, for example as in the first embodiment.

In a variant, the fixed frequency location can be central six physical resource blocks of bandwidth of a communication system.

In a variant, the receiving the first system information block can be conditional on receiving an indication that a corresponding access point is capable of supporting a user equipment category or a user equipment capability, for example as in the second embodiment in any of its variants.

In a variant, reception of the first system information block can be based on receiving a compact downlink channel indicator or information element field indicating a transport block size and/or frequency location of the first system information block, for example as in the third embodiment.

In a variant, the compact downlink channel indicator can indicate a transport block size index of physical downlink shared channel transmission.

In a variant, reception of the first system information block can be based on monitoring certain subframes based on a predefined pattern to decode a transport block size index of a physical downlink shared channel transmission for the first system information block, for example as in the fourth embodiment.

In a variant, the first system information block can provide information regarding a pattern of transmission of other system information messages, for example as in the fifth embodiment.

In a variant, the first system information block can provide an indication regarding a transport block size index and/or frequency location of other system information messages, for example as in the sixth embodiment.

According to eighth through fourteenth embodiments, an apparatus can include means for performing the method according to the first through seventh embodiments respectively, in any of their variants.

According to fifteenth through twenty-first embodiments, an apparatus can include at least one processor and at least one memory and computer program code. The at least one memory and the computer program code can be configured to, with the at least one processor, cause the apparatus at least to perform the method according to the first through seventh embodiments respectively, in any of their variants.

According to twenty-second through twenty-eighth embodiments, a computer program product may encode instructions for performing a process including the method according to the first through seventh embodiments respectively, in any of their variants.

According to twenty-ninth through thirty-fifth embodiments, a non-transitory computer readable medium may encode instructions that, when executed in hardware, perform a process including the method according to the first through seventh embodiments respectively, in any of their variants.

BRIEF DESCRIPTION OF THE DRAWINGS

For proper understanding of the invention, reference should be made to the accompanying drawings, wherein.

DETAILED DESCRIPTION

Figure 1:
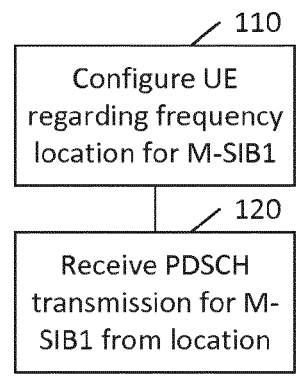
FIG. 1 illustrates a method according to certain embodiments.

In view of the effect of system information block (SIB) size on other factors, or for other reasons, it may be valuable to reduce the SIB size to keep the SIB size as small as possible, and to introduce new SIB(s) for Rel-13 low complexity UEs in normal and enhanced coverage. However, the design of such new SIBs as well as the scheduling scheme thereof, have not been provided.

It had been assumed that the legacy physical broadcast channel (PBCH) with additional repetitions would be utilized by Rel-13 low complexity UEs and UEs operating CE. However, the existing system information operation may not be applicable for Rel-13 low complexity UEs due to the constraint on their capabilities.

Certain embodiments provide an enhanced SIB scheduling scheme, which may be suitable for supporting the Rel-13 low complexity UE. Other uses of the SIB scheduling scheme are also permitted.

If the legacy PBCH is applied for the Rel-13 low complexity UEs with additional repetition to ensure the reliable reception from Rel-13 low complexity UEs, the detailed time diversity or spread for the master information block (MIB) transmission over a period of 40 ms may be variously accommodated.

Considering a transport block size (TBS) size limitation, there may be challenge to define a single SIB that contains all the substantial information that are required by or beneficial to the Rel-13 low complexity UEs. Therefore, multiple SIBs may be defined to provide more flexibility. For example, a new M-SIB1 can be defined similar to current SIB1. The new M-SIB1 can contain key information about the cell and network. The new M-SIB1 can also contain the scheduling information of other System Information messages which provide accessorial parameters of the cell. The Rel-13 low complexity UEs may optionally acquire those system information based on demand.

This new SIB1 can be referred to for convenience and without limitation as MTC system information block 1 (M-SIB1). Similarly, the other new SIBs can be referred to for convenience and without limitation as MTC system information blocks (M-SIBs) accordingly to make the discussion simpler.

Certain embodiments, the following features may be provided. There may be an additional capability indication for supporting Rel-13 low complexity UEs in MIB. Furthermore, there may be a predefined frequency allocation for BCH or PDSCH transmission of M-SIB1.

Additionally, there may be a new compact downlink control information (DCI) or a new system information field to indicate the TBS of M-SIB1. Moreover, there may be a predefined transmission pattern of "Physical downlink control channel for MTC" for indicating the TBS of M-SIB1. Also, there may be an indication of the TBS of other M-SIBs from M-SIB1. Furthermore, there may be an indication of transmission pattern of M-SIB1 in time domain from M-SIB1.

As mentioned above, in certain embodiments there may be a predefined frequency allocation for PDSCH transmission of M-SIB1. The M-SIB1 may be periodically transmitted on the BCH or PDSCH using a fixed schedule as the legacy SIB1. The pattern or the periodicity of the transmission may be different based on the special requirement from new type of UE.

Although it may be possible to indicate the new type of UE specific parameter by utilizing spare bits in MIB, another approach according to certain embodiments is that the UE may be able to detect M-SIB1 without prior knowledge of bandwidth allocation. This may be useful if, for example, the frequency location of M-SIB1 could not be carried in MIB. For example, the physical downlink shared channel (PDSCH) for M-SIB1 can be mapped to the central 6 physical resource blocks (PRBs), the way the PBCH has been transmitted.

FIG. 1 illustrates a method according to certain embodiments. In the method of FIG. 1, the frequency location for M-SIB1 can be fixed to, for example, central 6 PRBs of the LTE bandwidth or any other desired location. The location can be fixed by a standard. Thus, at 110 a device such as a user equipment (UE) can be configured to be aware of this fixed location, either by the manufacturer, network operator, or any other configuration technique. The UE can then, at 120, receive the PDSCH transmission for M-SIB1 from the fixed frequency location.

Also, as mentioned above, certain embodiments may provide an additional capability indication for supporting Rel-13 low complexity UEs or/and coverage enhancement in MIB.

In Rel-12, the eNB needs to indicate its capability for supporting Cat-0 UE in SIB1 in order to avoid the false access of Cat-0 UE to the legacy network. Moreover, in Rel-12 a Cat-0 UE can consider a cell that is incapable of supporting Cat. 0 as barred. However without knowing if the network is capable of supporting the enhanced feature of the new type of UE, the Rel-13 low complexity UEs may attempt to acquire the M-SIB1 from the predefined frequency location of the narrowband region (if applicable). Thus, in such a situation the UE may not decode the M-SIB1 successfully and it may keep trying the acquisition consequently.

Furthermore, a Rel-13 low cost complexity UE in coverage enhancement mode may consider that the UE is in the coverage extension area incorrectly after the failed M-SIB1 acquisition. In this case, the UE may start to acquire M-SIB1 using the coverage enhancement procedure assuming additional repetition of M-SIB1 is required for decoding M-SIB1 correctly. The unnecessary camping attempt to the cell which is incapable of supporting the new type of UEs may increase UE power consumption and prolong the normal access latency.

Figure 2:
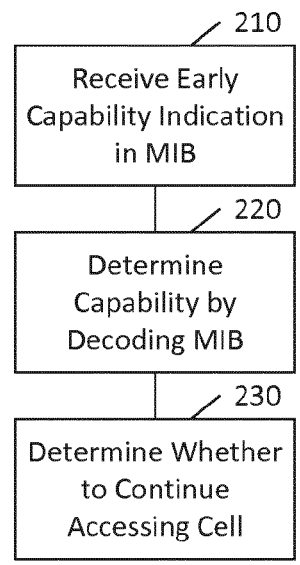
FIG. 2 illustrates another method according to certain embodiments.

FIG. 2 illustrates another method according to certain embodiments. In view of the above considerations, an early capability indication in MIB to UE may be desirable. Thus, at 210, a UE can receive an early capability indication in MIB. Then, at 220, the UE can determine capability based on decoding the MIB. Therefore, the Rel-13 low complexity UE may already know the network's capability after decoding MIB, by which the UE may be able to determine, at 230, whether to continue accessing the cell or not.

More particularly, the capability indication for supporting Rel-13 low complexity UE can be added in MIB, and could be a one bit parameter that utilizes one of the spare bits in the conventional MIB ASN.1 structure.

The determining, at 230, can include processing such that if the new parameter, which may be a one-bit indicator, indicates the support of Rel-13 low complexity UE, the UE can continue the M-SIB acquisition procedure. Otherwise the UE may consider the cell as barred. Alternatively, the determining, at 230, can include processing such that if an indicator implicitly indicates support of Rel-13 low complexity UE, the UE can continue the M-SIB acquisition procedure. Otherwise the UE may consider the cell as barred. Such implicit indicator may include scheduling information (e.g. TBS or frequency location) of M-SIB1, control format indicator field (e.g. to indicate the starting symbol of the "Physical downlink control channel for MTC"), coverage enhancement indicator, etc.

According to other aspects of certain embodiments, a new compact DCI can indicate the TBS of M-SIB1. Currently, DCI Format 1A or 1C can be used for signaling the resource assignment for the PDSCH transmission of paging and SI messages, which contains the resource block assignment, modulation and coding scheme (MCS). The MCS known by UE as quadrature phase shift keying (QPSK) is used when the DCI cyclic redundancy check (CRC) is scrambled by a radio network temporary identifier (RNTI), such as paging RNTI (P-RNTI), random access RNTI (RA-RNTI), or system information RNTI (SI-RNTI). Therefore, only resource block assignment may need to be indicated for Rel-13 low complexity UE. In case the frequency region within the system bandwidth is predefined or fixed for M-SIB1 (for example, in the center 6 PRBs), it may be sufficient to indicate only the TBS of PDSCH transmission for SIB1 and a new compact DCI which contains only the TBS index for M-SIB1 could be defined correspondingly. Other information, e.g. repetition factor or pattern, frequency hopping pattern or indicator, or indicator of additional reference signal, may be provided in the new compact DCI as well. Alternatively, in another example, the TBS and/or other scheduling information for M-SIB1 could be indicated using an information element field in the MIB.

Figure 3:
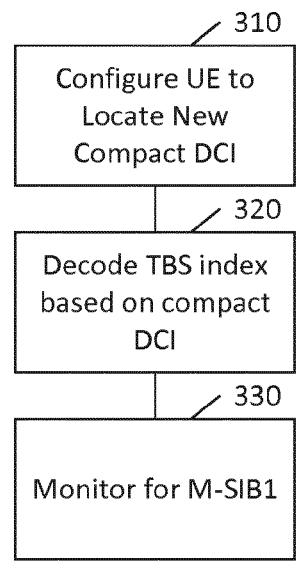
FIG. 3 illustrates a further method according to certain embodiments.

FIG. 3 illustrates a further method according to certain embodiments. In the embodiments illustrated in FIG. 3, a new compact DCI can be defined by standard specification to contain the TBS index of PDSCH transmission for M-SIB1 only, for example. In certain embodiments, only a subset of the current TBS index may be needed or a new TBS index optimized for SIB sizes may be defined.

Accordingly, as in FIG. 1, in FIG. 3 the UE can be configured, mat 310, by any suitable method to know how to locate and interpret the new compact DCI. Moreover, the Rel-13 low complexity UE can, at 320, decode the TBS index indicated by "Physical downlink control channel for MTC" based on the new compact DCI. The UE can then, at 330, monitor for M-SIB1 based on the TBS index.

In certain embodiments, at most 4 bits may be used for the TBS index. In this case, a shortened CRC can be used to further reduce the DCI size. In addition, scrambling by SI-RNTI may be done over the entire DCI instead of on the CRC only. For example, this new DCI can include a 4-bit TBS index, an 8-bit reserve, and a 4-bit CRC. The packet can then be scrambled by the 16-bit CRC prior to coding and rate-matching. Alternatively, both shortened CRC and SI-RNTI may be used. For example, this new DCI can include 4-bit TBS index and 4-bit CRC scrambled with shortened SI-RNTI, for example, the last 4 bits of SI-RNTI.

According to other aspects of certain embodiments, a predefined transmission pattern of "Physical downlink control channel for MTC" can be used for indicating the TBS of M-SIB1. In most cases, the system information of a cell may change rarely. Thus, there may be no need to indicate the TBS for each M-SIB1 transmission. To avoid the increased DL overhead and lower capacity due to the extra transmission repetition of PDSCH for M-SIB1, or for other reasons, the TBS indication of M-SIB1 may occur periodically. In such cases, the UE may only need to detect the TBS of M-SIB1 at the subframes derived from a pre-defined pattern. In addition, apart from the improved DL capacity, the periodic transmission of "Physical downlink control channel for MTC" may also reduce the UE power consumption.

Figure 4:
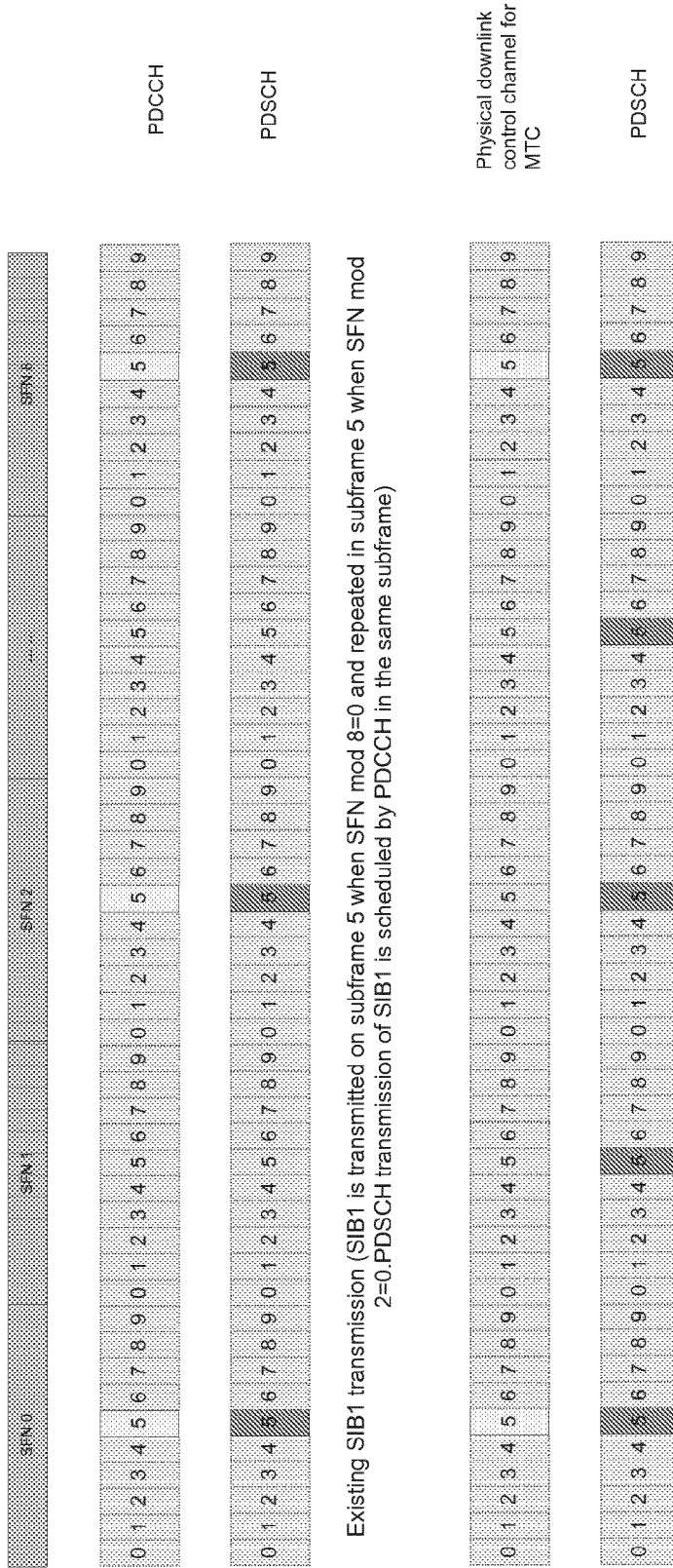
FIG. 4 illustrates periodic scheduling of PDSCH transmission for M-SIB1, according to certain embodiments.

FIG. 4 illustrates periodic scheduling of PDSCH transmission for M-SIB1, according to certain embodiments. More particularly, FIG. 4 illustrates periodic transmission of "Physical control channel for MTC" for M-SIB1. In certain embodiments, an additional repetition of PDSCH transmission of M-SIB1 may occur in subframe 5 of each frame due to the capabilities restrictions of the Rel-13 low complexity UE, while the TBS index of the M-SIB1 may be indicated on subframe 5 when SFN mode 8=0 by "Physical downlink control channel for MTC" only. The physical downlink control channel for MTC may use separate frequency location than PDSCH transmission.

This scheduling may be specified in a standard such that the transmission pattern of "Physical downlink control channel" for M-SIB1 is predefined.

Figure 5:
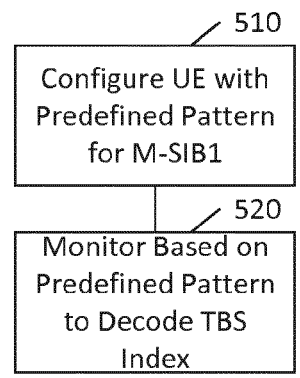
FIG. 5 illustrates a method according to certain embodiments.

FIG. 5 illustrates a method according to certain embodiments. As shown in FIG. 5, the method can include at 510 configuring, by any suitable technique, a UE to be aware of the predefined pattern for M-SIB1. Then, at 520, a Rel-13 low complexity UE can monitor "Physical downlink control channel for MTC" on certain subframes based on the predefined pattern to decode the TBS index of the PDSCH transmission for M-SIB1.

According to further aspects, certain embodiments can employ an indication of transmission pattern of SI message of M-SIB(s) in time domain from M-SIB1 The existing schedulingInfoList could be inherited, so that the M-SIBs other than M-SIB1 can be carried in System Information messages. The SI messages can then be transmitted on the DL-SCH for which flexible scheduling can be provided by various approaches. Mapping of M-SIBs other than M-SIB1 to SI messages may be flexible and may be indicated by M-SIB1. The UE may acquire M-SIB1 to know the required resource information of the SI messages on the concerned cell.

Unlike current SIB scheduling in which the transmission of the SI message is dynamic based on PDCCH indication within the associated SI-window, certain embodiments may transmit the SI messages either intermittently or continuously. The transmission pattern may be predefined by specification or broadcasted by M-SIB1 as one new parameter in schedulingInfoList.

Figure 6:
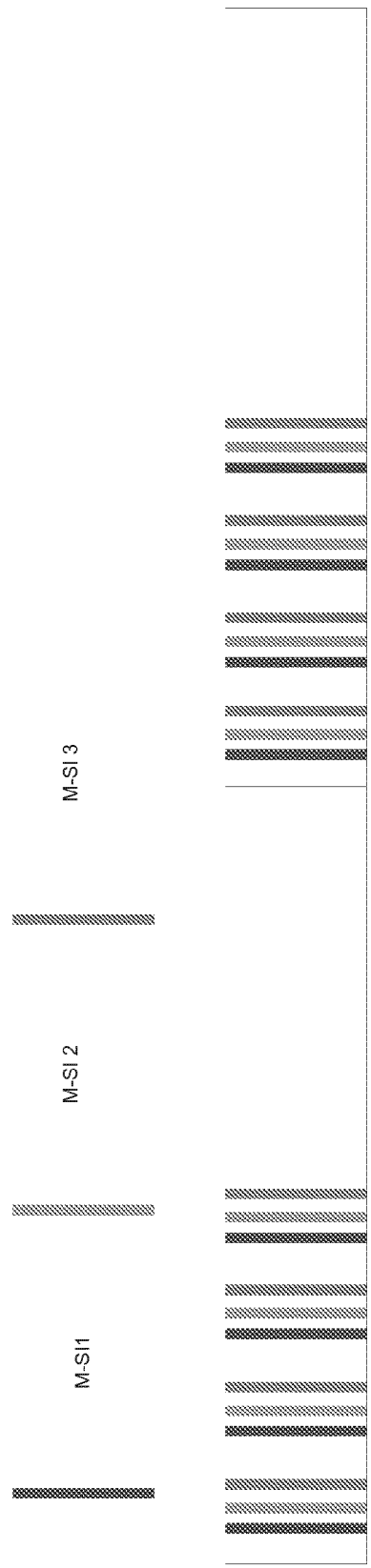
FIG. 6 illustrates intermittent SI transmission, according to certain embodiments.
Figure 7:
FIG. 7 illustrates continuous SI transmission, according to certain embodiments.

FIG. 6 illustrates intermittent SI transmission, according to certain embodiments, while FIG. 7 illustrates continuous SI transmission, according to certain embodiments. As can be seen from a comparison of FIG. 6 with FIG. 7, a difference between the two embodiments is that in the former case, the transmission of the various M-SIBs may occur less frequently but close to one another, whereas in the latter case, the transmission of the various M-SIBs may occur at regular intervals with respect to one another. Other transmission patterns are also permitted.

Figure 8:
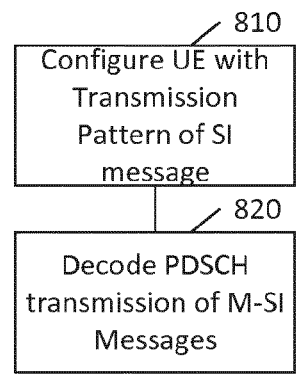
FIG. 8 illustrates a method according to certain embodiments.

FIG. 8 illustrates a method according to certain embodiments. In the embodiments illustrated in FIG. 8, the transmission pattern of SI message(s) can be defined in schedulingInfoList for M-SIBs. Also, the si-window can be removed from schedulingInfolist for M-SIBs. At 810, the UE can be configured by any suitable method, to handle the predefined transmission pattern of SI message(s). Moreover, at 820, a Rel-13 low complexity UE can decode the PDSCH transmission of M-SI messages from the subframe according to the pattern indicated by schedulingInfoList in M-SIB1.

According to further aspects of certain embodiments, an indication of the TBS of other M-SIBs can be provided in M-SIB1. If the M-SIBs are transmitted in the center 6 PRBs as M-SIB1, the UE may only need to know the TBS of the PDSCH transmission of other M-SIB(s). The TBS index could be added as additional parameter inside the updated schedulingInfoList. Alternatively the M-SIBs could also be transmitted within other narrowband location in the system. The frequency location for M-SIBs could also be added as another scheduling parameter inside schedulingInfoList.

Figure 9:
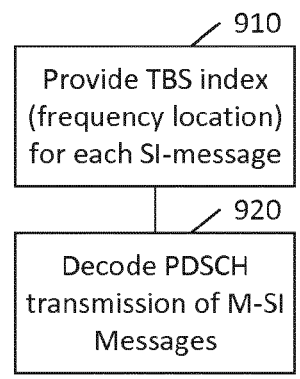
FIG. 9 illustrates a further method according to certain embodiments.

FIG. 9 illustrates a further method according to certain embodiments. In certain embodiments illustrated in FIG. 9, the TBS index and optionally the frequency location may be added, at 910, for each SI-message in schedulingInfoList. Then, at 920, a Rel-13 low complexity UE can decode the PDSCH transmission of M-SI messages based on the TBS (and optionally the frequency allocation) indicated by schedulingInfoList in M-SIB1.

Figure 10:
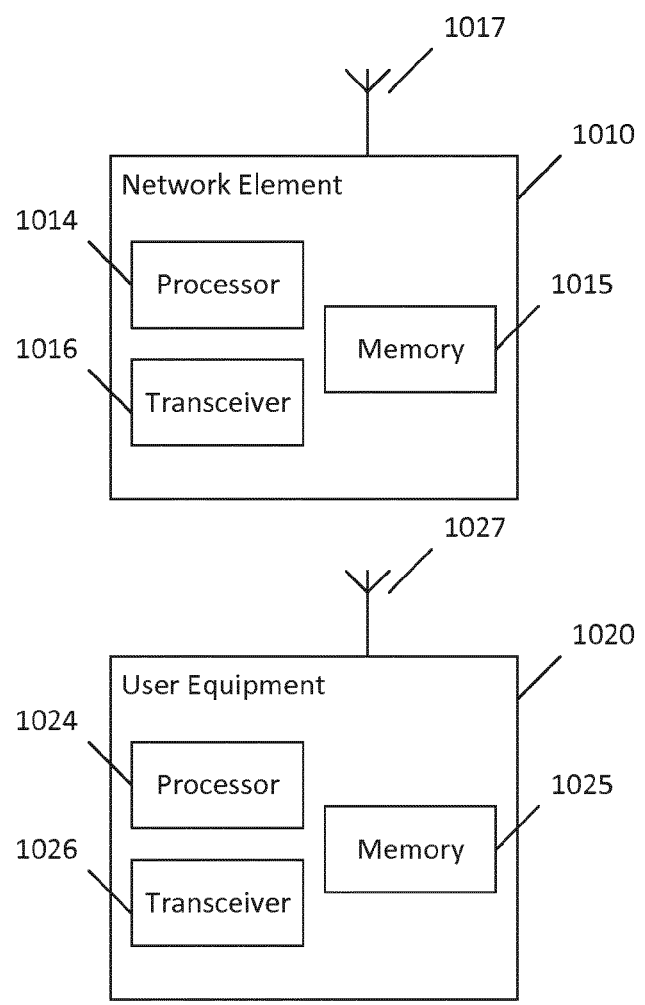
FIG. 10 illustrates a system according to certain embodiments.

FIG. 10 illustrates a system according to certain embodiments of the invention. It should be understood that each block of the flowcharts of FIGS. 1-3, 5, 8, and/or 9 may be implemented by various means or their combinations, such as hardware, software, firmware, one or more processors and/or circuitry. In one embodiment, a system may include several devices, such as, for example, network element 1010 and user equipment (UE) or user device 1020. The system may include more than one UE 1020 and more than one network element 1010, although only one of each is shown for the purposes of illustration. A network element can be an access point, a base station, an eNode B (eNB), or any other network element. Each of these devices may include at least one processor or control unit or module, respectively indicated as 1014 and 1024. At least one memory may be provided in each device, and indicated as 1015 and 1025, respectively. The memory may include computer program instructions or computer code contained therein. One or more transceiver 1016 and 1026 may be provided, and each device may also include an antenna, respectively illustrated as 1017 and 1027. Although only one antenna each is shown, many antennas and multiple antenna elements may be provided to each of the devices. Other configurations of these devices, for example, may be provided. For example, network element 1010 and UE 1020 may be additionally configured for wired communication, in addition to wireless communication, and in such a case antennas 1017 and 1027 may illustrate any form of communication hardware, without being limited to merely an antenna.

Transceivers 1016 and 1026 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 1020 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 1020 may be a sensor or smart meter, or other device that may usually be configured for a single location.

In an exemplifying embodiment, an apparatus, such as a node or user device, may include means for carrying out embodiments described above in relation to FIGS. 1-3, 5, 8, and/or 9.

Processors 1014 and 1024 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 1015 and 1025 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 1010 and/or UE 1020, to perform any of the processes described above (see, for example, FIGS. 1-3, 5, 8, and/or 9). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 10 illustrates a system including a network element 1010 and a UE 1020, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may provide various benefits and/or advantages. For example, the enhanced system information transmission scheme may provide improvements in the area of efficient handling of the control and data signaling for supporting the system information transmission specified for Rel-13 low complexity UE by taking into account the special characteristic and capability restrictions of the new type of UE.

As another consideration for MTC, extra UE power consumption may be needed due to required repetition. Thus, the system information procedure described herein may reduce the reception and transmission time in UE, which may save UE battery life correspondingly.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

CE—Coverage Enhancement
EMM—EPS Mobility Management
eNB—Evolved Node B
MME—Mobility Management Entity
MTC—Machine Type Communication
NAS—Non Access Stratum
PRACH—Physical Random Access CHannel RAR—Random Access Response
RRC—Radio Resource Control
S1AP—Signaling Radio Bearer
TAU—Tracking Area Update
UE—User Equipment

We claim:

1. A method, comprising:
   determining whether an access point supports a user equipment category or a user equipment capability by decoding master information block, wherein the master information block comprises an indication of narrow band location for machine type communication system information block 1; and
   determining whether to continue accessing a cell based on whether the access point supports the user equipment category or the user equipment capability,
   wherein the master information block comprises a scheduling information for the machine type communication system information block 1.

2. The method of claim 1, wherein the user equipment category or the user equipment capability is a user equipment category for machine type communication operation or a user equipment capability based on an existing user equipment category with reduced capabilities.

3. The method of claim 1, wherein a frequency location for each of a plurality of system information is indicated in the machine type communication system information block 1.

4. The method of claim 1, wherein transport block size for each of a plurality of system information is indicated in the machine type communication system information block 1.

5. The method of claim 1, wherein the user equipment category or user equipment capability comprises Release 13 low complexity user equipment.

6. An apparatus, comprising:
   at least one processor; and
   at least one memory including computer program code, wherein the at least one memory and the computer program code are configured to, with the at least one processor, cause the apparatus at least to
   determine whether an access point supports a user equipment category or a user equipment capability by decoding master information block, wherein the master information block comprises an indication of narrow band location for machine type communication system information block 1; and
   determine whether to continue accessing a cell based on whether the access point supports the user equipment category or the user equipment capability,
   wherein the master information block comprises a scheduling information for the machine type communication system information block 1.

7. The apparatus of claim 6, wherein the user equipment category or the user equipment capability is a user equipment category for machine type communication operation or a user equipment capability based on an existing user equipment category with reduced capabilities.

8. The apparatus of claim 6, wherein a frequency location for each of a plurality of system information is indicated in the machine type communication system information block 1.

9. The apparatus of claim 6, wherein transport block size for each of a plurality of system information is indicated in the machine type communication system information block 1.

10. The apparatus of claim 6, wherein the user equipment category or user equipment capability comprises Release 13 low complexity user equipment.

11. A non-transitory computer readable medium comprising program instructions stored thereon, wherein when the program instructions are executed by a processor, cause an apparatus to perform at least the following:
    determining whether an access point supports a user equipment category or a user equipment capability by decoding master information block, wherein the master information block comprises an indication of narrow band location for machine type communication system information block 1; and
    determining whether to continue accessing a cell based on whether the access point supports the user equipment category or the user equipment capability,
    wherein the master information block comprises a scheduling information for the machine type communication system information block 1.

12. The computer readable medium of claim 11, wherein the user equipment category or the user equipment capability is a user equipment category for machine type communication operation or a user equipment capability based on an existing user equipment category with reduced capabilities.

13. The computer readable medium of claim 11, wherein a frequency location for each of a plurality of system information is indicated in the machine type communication system information block 1.

14. The computer readable medium of claim 11, wherein transport block size for each of a plurality of system information is indicated in the machine type communication system information block 1.

15. The computer readable medium of claim 11, wherein the user equipment category or user equipment capability comprises Release 13 low complexity user equipment.

* * * * *